United States Patent
Gilquin et al.

(10) Patent No.: US 10,469,818 B1
(45) Date of Patent: Nov. 5, 2019

(54) SYSTEMS AND METHODS FOR FACILITATING CONSUMPTION OF VIDEO CONTENT

(71) Applicant: GoPro, Inc., San Mateo, CA (US)

(72) Inventors: Yann Gilquin, Chambéry (FR); Olivier Blanc, Albertville (FR); Samy Aboudrar, Challes-les-Eaux (FR)

(73) Assignee: GoPro, Inc., San Mateo, CA (US)

( * ) Notice: Subject to any disclaimer, the term of this patent is extended or adjusted under 35 U.S.C. 154(b) by 177 days.

(21) Appl. No.: 15/646,535

(22) Filed: Jul. 11, 2017

(51) Int. Cl.
| | |
|---|---|
| *H04N 9/802* | (2006.01) |
| *G11B 27/031* | (2006.01) |
| *H04N 5/265* | (2006.01) |
| *H04N 13/189* | (2018.01) |
| *H04N 13/324* | (2018.01) |
| *H04N 13/398* | (2018.01) |

(52) U.S. Cl.
CPC .......... *H04N 9/802* (2013.01); *G11B 27/031* (2013.01); *H04N 5/265* (2013.01); *H04N 13/189* (2018.05); *H04N 13/324* (2018.05); *H04N 13/398* (2018.05)

(58) Field of Classification Search
CPC .... H04N 9/802; H04N 13/189; H04N 13/324; H04N 13/398; H04N 5/265; G11B 27/031
USPC ....................................................... 386/280
See application file for complete search history.

(56) References Cited

U.S. PATENT DOCUMENTS

| | | | |
|---|---|---|---|
| 6,654,019 B2 | 11/2003 | Gilbert | |
| 8,022,948 B2 | 9/2011 | Garbow | |
| 9,363,569 B1 | 6/2016 | Van Hoff | |
| 9,602,795 B1 * | 3/2017 | Matias | ............... G06K 9/00744 |
| 2003/0160862 A1 | 8/2003 | Charlier | |
| 2003/0210327 A1 | 11/2003 | Mory | |
| 2004/0010804 A1 | 1/2004 | Hendricks | |
| 2004/0125133 A1 | 7/2004 | Pea | |

(Continued)

FOREIGN PATENT DOCUMENTS

| | | |
|---|---|---|
| WO | 2009047572 A1 | 4/2009 |
| WO | 2014090277 A1 | 6/2014 |

OTHER PUBLICATIONS

Kopf et al., "First-person Hyper-Lapse Videos" ACM Transactions on Graphics (Proceedings of SIGGRAPH 2014), 33(4), Article No. 78, 2014 (10 pages).

(Continued)

*Primary Examiner* — Thai Q Tran
*Assistant Examiner* — Nienru Yang
(74) *Attorney, Agent, or Firm* — Esplin & Associates, PC

(57) ABSTRACT

Spherical video content may define visual content viewable from a point of view as a function of progress through the spherical video content. The spherical video content may include an event of interest that occurs within an event moment and within an event extent of the visual content. The spherical video content may be presented on a display. Display fields of view defining extents of the visual content viewable from the point of view may be determined. The display fields of view may define a display extent of the visual content at the event moment. Whether the event extent is located within the display extent during the presentation of the spherical video content at the event moment may be determined. Responsive to a determination that the event extent is located outside the display extent, visual/audio effect may be applied to the presentation of the spherical video content.

16 Claims, 6 Drawing Sheets

(56) References Cited

U.S. PATENT DOCUMENTS

| | | |
|---|---|---|
| 2009/0278917 A1 | 11/2009 | Dobbins |
| 2010/0281375 A1 | 11/2010 | Pendergast |
| 2010/0299630 A1 | 11/2010 | McCutchen |
| 2011/0013778 A1 | 1/2011 | Takumai |
| 2012/0206565 A1 | 8/2012 | Villmer |
| 2013/0058535 A1 | 3/2013 | Othmezouri |
| 2013/0177168 A1 | 7/2013 | Inha |
| 2014/0039884 A1 | 2/2014 | Chen |
| 2015/0154452 A1* | 6/2015 | Bentley ............... G06K 9/00711 386/201 |
| 2015/0256746 A1* | 9/2015 | MacMillan ............. G06F 16/71 386/285 |
| 2015/0281710 A1* | 10/2015 | Sievert ................. H04N 19/164 375/240.02 |
| 2017/0084086 A1 | 3/2017 | Pio |
| 2017/0085964 A1 | 3/2017 | Chen |
| 2017/0157512 A1* | 6/2017 | Long .................... A63F 13/497 |

OTHER PUBLICATIONS

United States Office Action, U.S. Appl. No. 14/789,706, Jun. 7, 2016, ten pages.

O'Donovan, A., et al., "Real Time Capture of Audio Images and their Use with Video," 2007 IEEE Workshop on Applications of Signal Processing to Audio and Acoustics, Oct. 21-24, 2007, pp. 10-13.

O'Donovan, A., et al., "Audio-Visual Panoramas and Spherical Audio Analysis using the Audio Camera," C1 Proceedings of the 16th International Conference on Auditory Display, Jun. 9-15, 2010, pp. ICAD-167-168, can be retrieved at <URL: https://smartech.gatech.edu/bitstream/handle/1853/49858/0%27DonovanDuraiswami201 O.pdf?sequence=1 >.

"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:I/cnmat.berkelev.edu/spatialaudiolectures>.

PCT International Search Report and Written Opinion for PCT/US15/38913, dated Sep. 29, 2015, 15 Pages.

\* cited by examiner

SYSTEMS AND METHODS FOR FACILITATING CONSUMPTION OF VIDEO CONTENT

FIELD

This disclosure relates to facilitating consumption of video content based on events of interest and a user's viewing selections of the video content.

BACKGROUND

A video may include greater visual capture of one or more scenes/objects/activities (e.g., over-capture) than may be viewed at a moment. A user may view a video without realizing that an event of interest is not within the viewed portion of the video.

SUMMARY

This disclosure relates to facilitating consumption of video content. Video information defining spherical video content may be accessed. The spherical video content may have a progress length. The spherical video content may define visual content viewable from a point of view as a function of progress through the spherical video content. The spherical video content may include an event of interest. The event of interest may occur within an event moment in the progress length and within an event extent of the visual content viewable from the point of view at the event moment. The spherical video content may be presented on a display. At least a portion of the presentation of the spherical video content may be accompanied by playback of musical tracks. Display fields of view for the spherical video content may be determined. The display fields of view may define extents of the visual content viewable from the point of view as the function of progress through the spherical video content. The display fields of view may define a display extent of the visual content at the event moment. Whether the event extent is located within the display extent during the presentation of the spherical video content at the event moment may be determined. Responsive to a determination that the event extent is located outside the display extent, a visual effect and/or an audio effect may be applied to the presentation of the spherical video content.

A system that facilitates consumption of video content may include one or more processors, and/or other components. The processor(s) may be configured by machine-readable instructions. Executing the machine-readable instructions may cause the processor(s) to facilitate consumption of video content. The machine-readable instructions may include one or more computer program components. The computer program components may include one or more of an access component, a presentation component, a display field of view component, an event extent component, an effects component, and/or other computer program components.

The access component may be configured to access the video information defining one or more video content and/or other information. The access component may access video information from one or more storage locations. The access component may be configured to access video information defining one or more video content during acquisition of the video information and/or after acquisition of the video information by one or more image sensors.

Video content may refer to media content that may be consumed as one or more videos. Video content may include one or more videos stored in one or more formats/container, and/or other video content. Video content may have a progress length. The video content may define visual content viewable as a function of progress through the video content. In some implementations, video content may include one or more of spherical video content, virtual reality content, and/or other video content. Spherical video content and/or virtual reality content may define visual content viewable from a point of view as a function of progress through the spherical video content/virtual reality content.

The video content may include one or more events of interest. An event of interest may occur within an event moment in the progress length. The event of interest may occur within an event extent of the visual content viewable from the point of view at the event moment.

The presentation component may be configured to effectuate presentation of the video content on a display. For example, the presentation component may effectuate presentation of spherical video content on the display. One or more portions of the presentation of the video content may be accompanied by playback of musical tracks. In some implementations, the portion(s) of the presentation of the spherical video content may be accompanied by the playback of musical tracks based on the event of interest and/or other information. In some implementations, the musical tracks may include one or more directional musical tracks.

The display field of view component may be configured to determine display fields of view for the video content. For example, the display field of view component may determine display fields of view for the spherical video content. The display fields of view may define extents of the visual content viewable as the function of progress through the video content. For example, the display fields of view may define extents of the visual content viewable from the point of view of the spherical video content as the function of progress through the spherical video content. The display fields of view may define a display extent of the visual content at the event moment.

The event extent component may be configured to determine whether the event extent is located within the display extent during the presentation of the spherical video content at the event moment.

The effects component may be configured to, responsive to a determination that the event extent is located outside the display extent, apply one or more visual effect, one or more audio effects, and/or other effects to the presentation of the spherical video content. In some implementations, the visual effect(s) and/or the audio effect(s) may be determined based on the event of interest and/or other information. In some implementations, an amount or a type of the visual effect and/or the audio effect may be determined based on a distance between event extent and the display extent and/or other information.

In some implementations, an audio effect may change audio mixing of the musical tracks. In some implementations, the change in the audio mixing of the musical tracks may decrease an intensity of the playback of at least one of the musical tracks.

In some implementations, the visual effect may include one or more visual artifacts. In some implementations, the visual effect may change one or more of color, contrast, and/or luminance of the presentation of the video content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
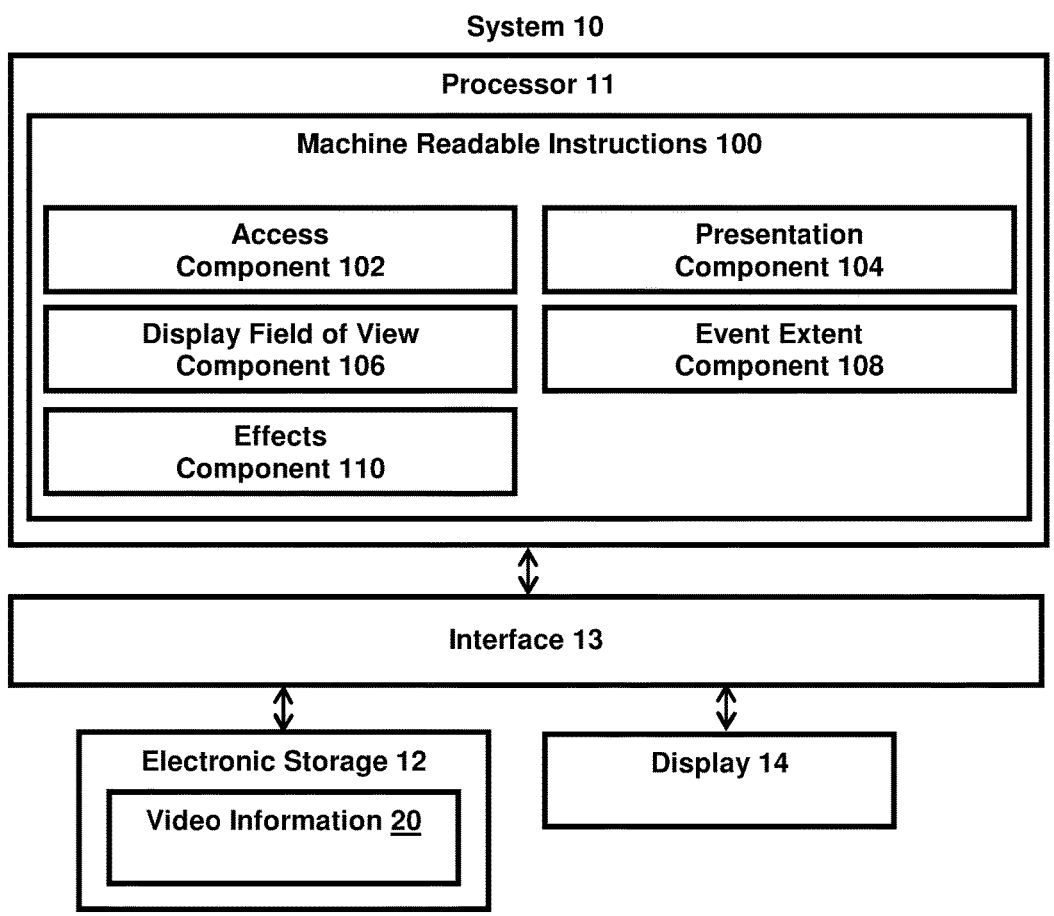
FIG. 1 illustrates a system that facilitates consumption of video content.

FIG. 1 illustrates a system 10 for facilitating consumption of video content. The system 10 may include one or more of a processor 11, an electronic storage 12, an interface 13 (e.g., bus, wireless interface), a display 14, and/or other components. Video information 20 defining spherical video content may be accessed by the processor 11. The spherical video content may have a progress length. The spherical video content may define visual content viewable from a point of view as a function of progress through the spherical video content. The spherical video content may include an event of interest. The event of interest may occur within an event moment in the progress length and within an event extent of the visual content viewable from the point of view at the event moment. The spherical video content may be presented on the display 14. At least a portion of the presentation of the spherical video content may be accompanied by playback of musical tracks.

Display fields of view for the spherical video content may be determined. Display fields of view may be determined based on a user's interaction with the display 14 and/or other device(s) to control/affect the presentation of the spherical video content on the display 14. The display fields of view may define extents of the visual content viewable from the point of view as the function of progress through the spherical video content. The display fields of view may define a display extent of the visual content at the event moment. Whether the event extent is located within the display extent during the presentation of the spherical video content at the event moment may be determined. Responsive to a determination that the event extent is located outside the display extent, a visual effect and/or an audio effect may be applied to the presentation of the spherical video content.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to video information, video content, musical tracks, display fields of view, event of interest, event extent, visual effect, audio effect, and/or other information.

The electronic storage 12 may store video information 20 defining one or more video content. Video content may refer to media content that may be consumed as one or more videos. Video content may include one or more videos stored in one or more formats/container, and/or other video content. A video may include a video clip captured by a video capture device, multiple video clips captured by a video capture device, and/or multiple video clips captured by separate video capture devices. A video may include multiple video clips captured at the same time and/or multiple video clips captured at different times. A video may include a video clip processed by a video application, multiple video clips processed by a video application and/or multiple video clips processed by separate video applications.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other time durations and frame numbers are contemplated.

Video content may define visual content viewable as a function of progress through the video content. In some implementations, video content may include one or more of spherical video content, virtual reality content, and/or other video content. Spherical video content and/or virtual reality content may define visual content viewable from one or more points of view as a function of progress through the spherical/virtual reality video content.

Spherical video content may refer to a video capture of multiple views from a single location. Spherical video content may include a full spherical video capture (360 degrees of capture) or a partial spherical video capture (less than 360 degrees of capture). Spherical video content may be captured through the use of one or more cameras/image sensors to capture images/videos from a location. The captured images/videos may be stitched together to form the spherical video content.

Virtual reality content may refer to content (e.g., spherical video content) that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

The display 14 may be configured to present video content and/or other information. Presentation of the video content on the display 14 may be controlled/changed based on a user's interaction with the display 14 and/or other devices. For example, the display 14 may include a touch-screen display, and the presentation of the video content on the display 14 may be controlled/changed based on a user's interactions with the touchscreen display. A user may interact with the touchscreen display to indicate the user's viewing selections of the video content (e.g., the user pinching/unpinching the touchscreen display to change zoom settings, the user making swiping motions on the touchscreen display to change the direction of view, the user interacting with displayed icons/commands/buttons to change the presentation). The display 14 may include one or more motion sensors, and the presentation of the video content on the display 14 may be controlled/changed based on the user's interaction with the display 14 to move/orient the display 14. The display 14 may be coupled (directly/indirectly) with one or more peripheral devices (e.g., mouse, keyboard, microphone) through which user interactions indicating the user's viewing selections may be received.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate consumption of video content. The machine readable instructions 100 may include one or more computer program components. The machine readable instructions 100 may include one or more of an access component 102, a presentation component 104, a display field of view component 106, an event extent component 108, an effects component 110, and/or other computer program components.

The access component 102 may be configured to access video information defining one or more video content and/or other information. Accessing the video information may include one or more of acquiring, analyzing, determining, examining, locating, obtaining, receiving, retrieving, reviewing, storing, and/or otherwise accessing the video information. The access component 102 may access video information from one or more storage locations. A storage location may include electronic storage 12, electronic storage of one or more image sensors (not shown in FIG. 1), electronic storage of a device accessible via a network, and/or other locations. For example, the access component 102 may access the video information 20 stored in the electronic storage 12. The access component 102 may be configured to access video information defining one or more video content during acquisition of the video information and/or after acquisition of the video information by one or more image sensors. For example, the access component 102 may access video information defining video while the video is being captured by one or more image sensors. The access component 102 may access video information defining a video after the video has been captured and stored in memory (e.g., the electronic storage 12).

Figure 3:
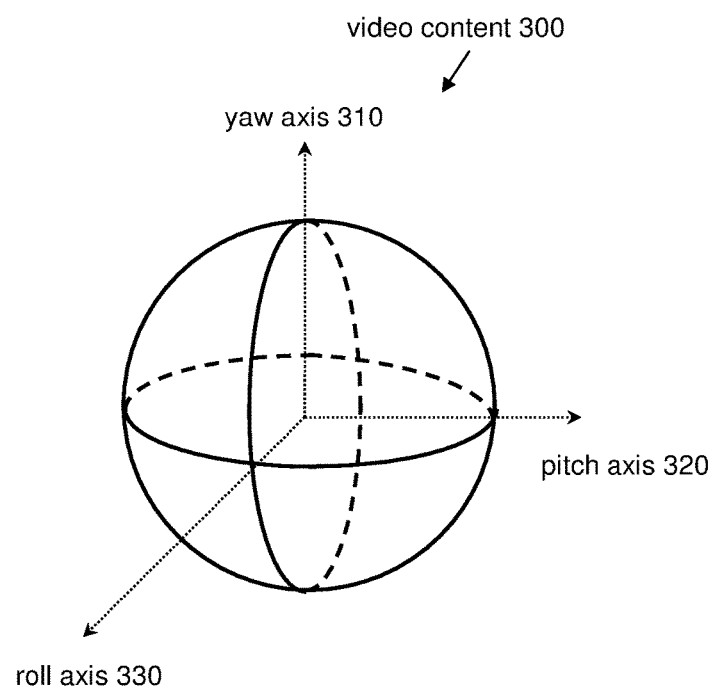
FIG. 3 illustrates an example spherical video content.

FIG. 3 illustrates an example video content 300 defined by video information. The video content 300 may include spherical video content. FIG. 3 illustrates example rotational axes for the video content 300. Rotational axes for the video content 300 may include a yaw axis 310, a pitch axis 320, a roll axis 330, and/or other axes. Rotations about one or more of the yaw axis 310, the pitch axis 320, the roll axis 330, and/or other axes may define viewing directions for the video content 300.

For example, a 0-degree rotation of the video content 300 around the yaw axis 310 may correspond to a front viewing direction. A 90-degree rotation of the video content 300 around the yaw axis 310 may correspond to a right viewing direction. A 180-degree rotation of the video content 300 around the yaw axis 310 may correspond to a back viewing direction. A −90-degree rotation of the video content 300 around the yaw axis 310 may correspond to a left viewing direction.

A 0-degree rotation of the video content 300 around the pitch axis 320 may correspond to a viewing direction that is level with respect to horizon. A 45-degree rotation of the video content 300 around the pitch axis 320 may correspond to a viewing direction that is pitched up with respect to horizon by 45-degrees. A 90 degree rotation of the video content 300 around the pitch axis 320 may correspond to a viewing direction that is pitched up with respect to horizon by 90-degrees (looking up). A −45-degree rotation of the video content 300 around the pitch axis 320 may correspond to a viewing direction that is pitched down with respect to horizon by 45-degrees. A −90 degree rotation of the video content 300 around the pitch axis 320 may correspond to a viewing direction that is pitched down with respect to horizon by 90-degrees (looking down).

A 0-degree rotation of the video content 300 around the roll axis 330 may correspond to a viewing direction that is upright. A 90 degree rotation of the video content 300 around the roll axis 330 may correspond to a viewing direction that is rotated to the right by 90 degrees. A −90-degree rotation of the video content 300 around the roll axis 330 may correspond to a viewing direction that is rotated to the left by 90-degrees. Other rotations and viewing directions are contemplated.

Figures 4A, 4B:
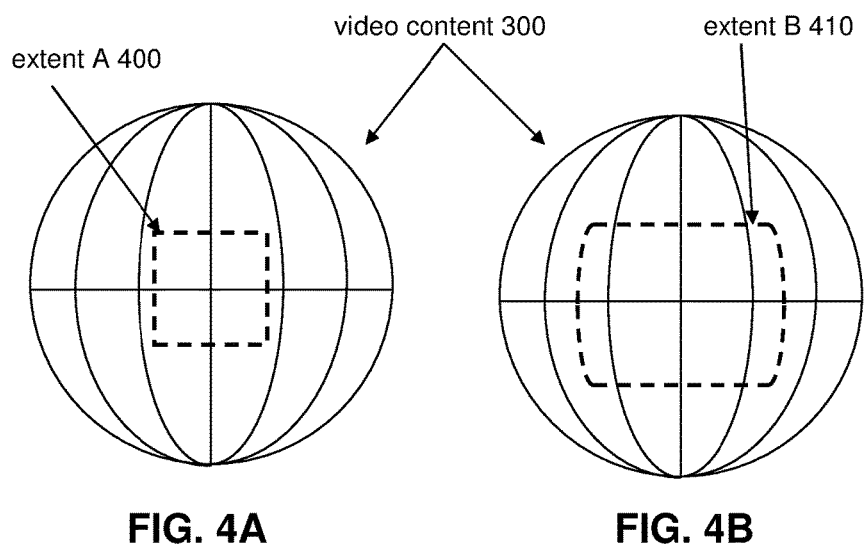
FIGS. 4A-4B illustrate example extents of spherical video content.

In some implementations, the user's viewing selections may include viewing zooms for the video content selected by the user as the function of progress through the video content. Viewing zooms for the video content may correspond to a size of the viewable extents of visual content within the video content. For example, FIGS. 4A-4B illustrate examples of extents for video content 300. In FIG. 4A, the size of the viewable extent of the video content 300 may correspond to the size of extent A 400. In FIG. 4B, the size of viewable extent of the video content 300 may correspond to the size of extent B 410. Viewable extent of the video content 300 in FIG. 4A may be smaller than viewable extent of the video content 300 in FIG. 4B.

The video content may include one or more events of interest. An event of interest may refer to an appearance/occurrence of one or more visuals/audio of interest within the video content. An event of interest may be manually identified (e.g., based on user input) or automatically identified (e.g., based on analysis of the video content/metadata of the video content). An event of interest may occur within an event moment in the progress length. An event moment may refer to a point or a duration within the progress of the video content.

An event of interest may occur within an event extent of the video content. An event extent may include one or more spatial amounts of the visual content of the video content that include the event of interest at the event moment. For example, an event extent for spherical video content may refer to particular portion of visual content viewable from the point of view at the event moment. The event extent may be defined by one or more viewing directions and/or viewing zooms. For example, a particular event within spherical video content may occur at a spatial portion of the spherical video content that is viewable using a particular viewing directions (e.g., front viewing direction) and a particular viewing zoom (e.g., 2× zoom) at a particular point/duration (e.g., thirty second mark, a range of 1000th to 1240th frames) within the progress of the spherical video content.

The presentation component 104 may be configured to effectuate presentation of video content on the display 14. For example, the presentation component 104 may effectuate presentation of spherical video content on the display 14. Presentation of the video content on the display 14 may include presentation of the video content based on a user's viewing selections of the video content. Based on the user's viewing selections (e.g., viewing directions defining rotations around the yaw axis 310, the pitch axis 320, the roll axis 330, and/or other axes; viewing zooms defining the amount of visible field of view) of the video content, the presentation component 104 may present same/different spatial portions of the video content as a function of progress through the video content and/or may present the spatial portions in the same way or differently (e.g., using different projections, using different filters).

One or more portions of the presentation of the video content may be accompanied by playback of musical tracks. A musical track may refer to a track of recorded and/or synthesized music. A musical track may include audio of one or more voices, instruments, and/or other sounds. Multiple musical tracks may be complementary of each other. For example, a particular song may be defined by one or more vocal musical tracks, beat musical tracks, bass musical tracks, instrumental musical tracks, and/or other musical tracks. Other types of musical tracks are contemplated.

In some implementations, the portion(s) of the presentation of the spherical video content may be accompanied by the playback of musical tracks based on the event of interest and/or other information. One or more musical tracks may accompany the presentation of the video content on the display 14 based on the presentation of the video content being near/at the event moment. For example, based on the presentation of the video content being near/at the event moment, one or more musical tracks may be played/changed. Playback of musical track(s) and/or changes in the playback of musical track(s) may be provided as a cue to a user that the presentation of the video content is near/at an event moment.

In some implementations, the musical tracks may be selected for playback based on the event of interest. Different musical tracks may be associated with different events of interest. For example, a given event of interest may be associated with given musical track(s) and the given musical track(s) may accompany the presentation of the given event of interest during playback of the video content. A given event of interest may be associated with group(s) of musical tracks and one or more of the musical tracks may accompany the presentation of the given event of interest during playback of the video content.

In some implementations, the musical tracks may include one or more directional musical tracks. Directional musical tracks may indicate via produced audio the direction of the event of interest in the video content. For example, the directional musical track may be played differently based on whether a display field of view includes or does not include the event of interest. The directional musical track may provide a cue to a user as to where the event of interest is/will be located (event location). In some implementations, directional musical track may simulate one or more sounds coming from the event location. For example, if the event of interest is/will be located to the right of where the user is viewing, the directional musical track may be played from the right of the user (e.g., from the right headphone/speaker). Mixing/panning of the musical track may indicate where the user should look to view the event of interest. In some implementations, directional musical track may include one or more binaural audio.

The display field of view component 106 may be configured to determine display fields of view for the video content. For example, the display field of view component 106 may determine display fields of view for the spherical video content. The display fields of view may define extents of the visual content viewable (e.g., extent A 400 shown in FIG. 4A, extent B 410 shown in FIG. 4B) as the function of progress through the video content. The display fields of view may define a display extent of the visual content at the event moment. For example, for spherical video content, the display fields of view may define extents of the visual content viewable from the point of view of the spherical video content as the function of progress through the spherical video content. As a user's viewing selections of the video content changes, the display field of view component 106 may determine changes in the display fields of view. The display field of view component 106 may determine the display field of view for spherical video content at the event moment (moment at which an event of interest occurs). Such a display field of view may be referred to as a display extent.

The display field of view component 106 may determine display fields of view based on a user's viewing selections of the video content and/or other information. For example, the display fields of view may be determined based on the viewing directions, the viewing zooms, and/or other information. As a user changes one or more of viewing directions, viewing zoom, and/or other parameters associated with presentation of the video content, the display field of view component 106 may determine changes in the display fields of view.

For example, based on orientations of a mobile device presenting the video content, the viewing directions may be determined (e.g., the viewing directions 500 shown in FIG. 5) and the display fields of view may be determined based on the viewing directions. The display fields of view may change based on changes in the viewing directions (based on changes in the orientation of the mobile device), based on changes in the viewing zooms, and/or other information. For example, a user of a mobile device may be viewing video content while holding the mobile device in a landscape orientation. The display field of view may define a landscape viewable extent of the visual content within the video content. During the presentation of the video content, the user may switch the orientation of the mobile device to a portrait orientation. The display field of view may change to define a portrait viewable extent of the visual content within the video content. Other changes in the viewing directions (e.g., received based on a user's interactions with the display 14 and/or other devices) are contemplated.

For spherical video content, the display fields of view may define extents of the visual content viewable from a point of view as the function of progress through the spherical video content. For example, the display fields of view may define a first extent of the visual content at a first point in the progress length and a second extent of the visual content at a second point in the progress length. The presentation of the spherical video content on the display 14 may include presentation of the extents of the visual content on the display 14 at different points in the progress length such that the presentation of the spherical video content on the display 14 includes presentation of the first extent at the first point prior to presentation of the second extent at the second point. For example, a user may move a mobile device presenting the spherical video content to view different spatial portions of the spherical video content.

A user's viewing selections of the video content may remain the same or change as a function of progress through the video content. For example, a user may view spherical video content without changing the viewing direction (e.g., a user may view a "default view" of spherical video content captured at a music festival, etc.). A user may view the video content by changing the directions of view (e.g., a user may change the viewing direction of spherical video content captured at a music festival to follow a particular band, etc.). Other changes in a user's viewing selections of the video content are contemplated.

Figure 5:
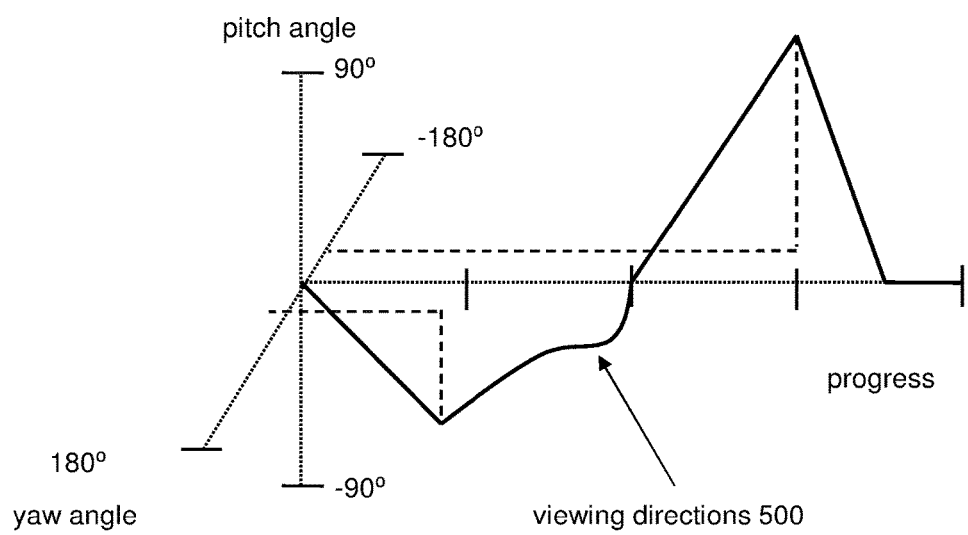
FIG. 5 illustrates example viewing directions selected by a user.

FIG. 5 illustrates an exemplary viewing directions 500 selected by a user for spherical video content as a function of progress through the spherical video content. The viewing directions 500 may change as a function of progress through the spherical video content. For example, at 0% progress mark, the viewing directions 500 may correspond to a zero-degree yaw angle and a zero-degree pitch angle. At 25% progress mark, the viewing directions 500 may correspond to a positive yaw angle and a negative pitch angle. At 50% progress mark, the viewing directions 500 may correspond to a zero-degree yaw angle and a zero-degree pitch angle. At 75% progress mark, the viewing directions 500 may correspond to a negative yaw angle and a positive pitch angle. At 87.5% progress mark, the viewing directions 500 may correspond to a zero-degree yaw angle and a zero-degree pitch angle. One or more portions of the viewing direction 500 may be associated with the same or different roll angles. One or more portions of the viewing direction 500 may be associated with the same or different viewing zooms. Other selections of viewing directions/selections are contemplated.

The event extent component 108 may be configured to determine whether an event extent is located within a display extent during the presentation of the video content (e.g., spherical video content) at an event moment. Determining whether an event extent is located within a display extent may include determining whether the event extent is wholly or partially located within the display extent. Determining whether an event extent is located within a display extent may include determining whether the event extent is centered or not centered within the display extent. Determining whether an event extent is located within a display extent may include determining direction and/or distance between the event extent (e.g., center of the event extent) and the display extent (e.g., center of the display extent.).

Figure 6:
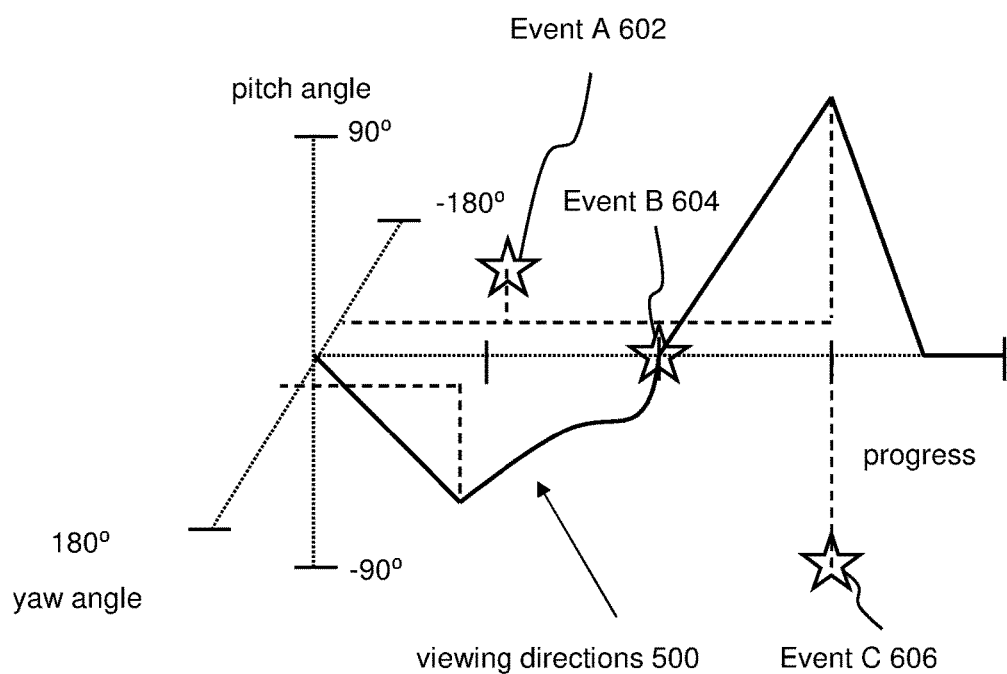
FIG. 6 illustrates events of interest within spherical video content and example viewing directions selected by a user.

FIG. 6 illustrates example events of interest (event A 602, event B 604, event C 606) within spherical video content and example viewing directions 500 selected by a user for the spherical video content. At 25% progress mark, the viewing directions 500 may correspond to a positive yaw angle and a negative pitch angle, and the event A 602 may occur at a negative yaw angle and a positive pitch angle. Based on the viewing zoom at the 25% progress mark, the event extent of the event A 602 may not be located within the display field of view (e.g., the display extent) at the 25% progress mark.

At 50% progress mark, the viewing directions 500 may correspond to a zero-degree yaw angle and a zero-degree pitch angle, and the event B 604 may occur at the zero-degree yaw angle and the zero-degree pitch angle. Based on the viewing zoom at the 50% progress mark, the event extent of the event B 604 may be located within the display field of view (e.g., the display extent) at the 50% progress mark.

At 75% progress mark, the viewing directions 500 may correspond to a negative yaw angle and a pitch angle of ninety-degrees, and the event C 606 may occur at a zero-degree yaw angle and a pitch angle of negative ninety-degrees. Based on the viewing zoom at the 75% progress mark, the event extent of the event C 606 may not be located within the display field of view (e.g., the display extent) at the 75% progress mark.

As shown in FIG. 6, the viewing direction 500 chosen by a user for the spherical video content may result in the presentation of the spherical video content not including the event A 602 at the 25% progress mark and not including the event C 606 at the 75% progress mark. Thus, while spherical video content may provide a user with freedom to choose a particular view of the visual/audio content captured within the spherical video content, such freedom may result in the user not seeing the event(s) of interest within the spherical video. It may be difficult for a user to be guided in where the user may look within the spherical video content to see interesting moments. Such difficulty in driving users to consume spherical video content may make it difficult for a provider of the spherical video content to create/tell a particular story (e.g., matching content within the spherical video content with particular music) with the spherical video content.

In a traditional video content consumption, music and visual content framing may contribute to the creation of certain style/atmosphere around a particular point in the video content. For example, music and visual content framing may add tension/drama when action/activity captured within the video content increases or may release pressure when a turning point in the video content has been reached. The music and visual content framing may provide a particular "story" using both visual and audio elements. Spherical video content's provision of freedom for a user to look at different spatial portions of the spherical video content at different moments may interfere with how a provider of the spherical video content wishes to tell a story using the spherical video content.

By determining locations of events of interest within spherical video content and whether the events of interest are within display fields of view, the system 10 may drive one or more users to consume the spherical video content so that the musical element(s) and the viewed visual element(s) are aligned. User(s) may be driven to view the spherical video content in a particular way based on application of one or more audio effects and/or one or more visual effects.

The effects component 110 may be configured to, responsive to a determination that the event extent is located outside the display extent, apply one or more audio effect, one or more visual effects, and/or other effects to the presentation of the video content. For example, the effects component 110 may, responsive to a determination that the event extent is located outside the display extent, apply one or more audio effect, one or more visual effects, and/or other effects to the presentation of the spherical video content. The effect(s) applied to the video content may drive one or more users viewing the video content to watch spatial portions of the video content that include events of interest.

An audio effect may refer to one or more processes by which audio presentation of the video content and/or playback of musical track(s) that company presentation of the video content may be changed. An audio effect may change the audio presentation of the video content and/or playback of musical track(s) or a point in time, and/or for a duration of time during the presentation of the video content. For example, based on an event extent being located outside display fields of view, an audio effect may change the playback of musical tracks to indicate to a user that the user's current display field of view is missing/will miss the occurrence of an event of interest. An audio effect may prompt a user to change the viewing selections to find the extent at which the event of interest occurs/will occur.

In some implementations, an audio effect may change audio mixing of the musical tracks. For example, a portion of the presentation of video content may be accompanied by multiple musical tracks. Based on the user's display field of view not including the extent at which the event of interest occurs/will occur (event extent), an audio effect may remove one or more musical tracks from playback. As the user changes the viewing selection to bring the display field of view closer to the event extent, musical tracks may be added to the playback to indicate that the user is getting closer to viewing the event of interest. As the user changes the viewing selection to move the display field of view away from the event extent, additional musical tracks may be removed from playback to indicate that the user is getting further away from viewing the event of interest.

In some implementations, the change in the audio mixing of the musical tracks may decrease the intensity of the playback of the musical track(s). Intensity of the playback of the musical track(s) may refer to the energy (e.g., volume) of the musical track playback and/or the number of musical tracks that are included in the playback. For example, as the user changes the viewing selection to bring the display field of view closer to the event extent, the intensity of the playback of musical track(s) may be increased (e.g., via increase in volume, via addition of musical tracks to playback) to indicate that the user is getting closer to viewing the event of interest. As the user changes the viewing selection to move the display field of view away from the event extent, the intensity of the playback of musical track(s) may be decreased (e.g., via decrease in volume, via removal of musical tracks from playback) to indicate that the user is getting further away from viewing the event of interest.

In some implementations, an audio effect may change other audio aspects of the presentation of video content. An audio effect may change playback of the audio within the video content and/or musical tracks accompanying the presentation of the video content. For example, an audio effect may include one or more of equalization, delay, echo, reverb, phasing, flanging, filters, and/or other audio effects. Other audio effects are contemplated.

A visual effect may refer to one or more processes by which visual presentation of video content may be changed. A visual effect may change the presentation of the video content for a video frame, for multiple frames, for a point in time, and/or for a duration of time. For example, based on an event extent being located outside display fields of view, a visual effect may change the visual presentation of the video content to indicate to a user that the user's current display field of view is missing/will miss the occurrence of an event of interest. A visual effect may prompt a user to change the viewing selections to find the extent at which the event of interest occurs/will occur.

In some implementations, the visual effect may include one or more visual artifacts. A visual artifact may refer to one or more anomalies in the presentation of the video content. A visual artifact may include introduction of visual elements (e.g., snow/static/glare/patterns on screen), changes in how visual elements of the video content are presented (e.g., warping, softening, blurring, sharpening, changes in color, contrast, luminance), and/or other visual artifact. A visual artifact may be applied across the extent of the video content presented on a display (the display 14) or a portion of the extent of the video content presented the display. For example, based on an event extent being located outside display fields of view, snow/static/glare/blur may be applied across the viewed portion of the video content presented on the display. The snow/static/glare/blur may be applied uniformly across the viewed portion or non-uniformly across the viewed portion (e.g., less visual artifacts may appear in the direction of the event of interest, such as the visual elements being blurred by less amount in the direction of/closer to the event of interest). Based on an event extent being located outside display fields of view, snow/static/glare/blur may be applied to one or more parts of the video content presented on the display. The snow/static/glare/blur may be applied to part(s) that are further away from the event on interest, and a user may be guided to the event of interest by changing the viewing selection in the direction with no/less snow/static/glare/blur. In some implementations, application of blurring may simulated a depth of field in the video content, where the event extent appears to be in focus while other extents appears to be out of focus. Other visual effects are contemplated.

In some implementations, audio and/or visual effects may be applied to the presentation of the video content to augment a user's experience in viewing the events of interest. For example, audio and/or visual effect (e.g., increased audio intensity, playback of additional/different musical tracks, visual filters) may be applied while a user is viewing events of interest to give more focus/excitement to the moment. For example, an event of interest may include a romantic moment and the visual effect may apply visual effects that adds more romance (e.g., applying softening filters, color/light changes) to the presentation closer the display field of view is to the event of interest.

Referring to FIG. 6, based on the display field of view not including the event extent of the event A 602 at the 25% progress mark, the effects component 110 may apply one or more effects to drive a user to change viewing selections (e.g., viewing direction, viewing zoom) such that the display field of view includes the event extent of the event A 602. Based on the display field of view including the event extent of event B 604 at the 25% progress mark, the effects component 106 may not apply one or more effects to drive a user to change viewing selections. In some implementations, the effects component 110 may apply audio and/or visual effect(s) to augment a user's experience in viewing the event B 604. Based on the display field of view not including the event extent of the event C 606 at the 75% progress mark, the effects component 110 may apply one or more effects to drive a user to change viewing selections (e.g., viewing direction, viewing zoom) such that the display field of view includes the event extent of the event C 606.

In some implementations, the effects component 110 may be configured to apply the audio effect(s) and/or the visual effect(s) to the video content (e.g., spherical video content) to drive a user to change viewing selection before the presentation of the video content reaches event moments. For example, referring to FIG. 6, prior to the presentation of the spherical video content at the 25% progress mark, the effects component 110 may apply the audio effect(s) and/or visual effect(s) to the spherical video content to drive a user to change viewing selections before the presentation of the video content reaches the 25% progress mark. The amount (e.g., duration, video frames) by which the application of the effect(s) precedes the event moments may be determined based on defaults, user input, event of interest (e.g., different events of interest/types of events of interest corresponding to different amounts), and/or other information.

In some implementations, visual effect(s) and/or audio effect(s) may be determined based on the event of interest and/or other information. Different events of interest may be associated with visual effect(s) and/or audio effect(s). For example, a given event of interest may be associated with given visual/audio effect(s) and the given visual/audio effect(s) may be applied to the video content based on the display field of view not including the given event of interest. A given event of interest may be associated with group(s) of visual/audio effects and one or more of the effects may be applied to the video content based on the display field of view not including the given event of interest. In some implementations, visual effect(s) and/or audio effect(s) may be determined based on defaults, user input (e.g., user selection of effect(s) to be applied), and/or other information. For example, a user may select particular effect(s) to be applied during presentation of video content to tell a particular story using particular visual effects and/or audio effects.

The use of visual and audio effects as described herein may provide a tool to use emotion/story of the video content to guide a user to particular views within the video content. The use of visual and audio effects as described herein may allow the visual and musical elements to be aligned to create emotions and feelings during presentation of the video content. The use of visual and audio effects as described herein may allow the visual and musical elements to be aligned to create different emotions and different feelings based on how a user chooses to consume the video content. The visual and audio effects may be used as a tool to drive a user to particular views of the video content and immerse the viewer in the story atmosphere based on which portions/spatial extents of the video content are seen by the viewer.

In some implementations, an amount or a type of visual effect(s) and/or audio effect(s) may be determined based on the distance between event extent and the display extent and/or other information. Based on the distance between the event extent and the display extent (and/or the display field of view prior to the event moment), the amount of the visual and/or audio effects may be determined such that the amount applied to the presentation of video content increases with increasing distance. For example, referring to FIG. 6, based on the distance between the event extent of event C 606 and the display field of view at the 75% progress mark being greater than the distance between the event extent of event A 602 and the display field of view at the 25% progress mark, greater amount of effect(s) may be applied to the presentation of the spherical video content at the 75% progress mark (and/or prior to the 75% progress mark) than at the 25% progress mark (and/or prior to the 25% progress mark). The amount of visual and/or audio effect(s) applied may be changed linearly or non-linearly with change in the distance between the event extent and the display field of view.

Greater amount of visual/audio effects applied to the presentation of the video content at the 75% progress mark (and/or prior to the 75% progress mark) may provide a greater impetus for a user to change the viewing directions to include the event of interest within the display field of view than at the 25% progress mark (and/or prior to the 25% progress mark). For example, greater amount of visual artifact/greater reduction in playback of musical tracks may be applied based on the distance between the event extent and the display extent (and/or the display field of view prior to the event moment) being greater.

Based on the distance between the event extent and the display extent (and/or the display field of view prior to the event moment), the type of the visual and/or audio effects may be determined such that the different types of visual and/or audio effects are applied to the presentation of video content at different distances. For example, referring to FIG. 6, based on the distance between the event extent of event C 606 and the display field of view at the 75% progress mark being greater than the distance between the event extent of event A 602 and the display field of view at the 25% progress mark, one type of visual and/or audio effect(s) may be applied to the presentation of the spherical video content at the 75% progress mark (and/or prior to the 75% progress mark) and another type of visual and/or audio effect(s) may be applied to the presentation of the spherical video content than at the 25% progress mark (and/or prior to the 25% progress mark).

The type of visual and/or audio effects applied to the presentation of the video content based on greater distance between the event extent and the display extent (and/or the display field of view prior to the event moment) may provide a greater impetus for a user to change the viewing directions to include the event of interest. For example, the type of visual and/or audio effects applied at the 75% progress mark may be more disruptive to the presentation of the video content than the type of visual and/or audio effects applied at the 25% progress mark.

Such changes in the amount and/or type of effects applied to the presentation of the video content may guide a user to change viewing selections to include the events of interests within display fields of view. For example, based on a user's viewing selection leading to a display field of view being far from an event extent of an event of interest, visual/audio effect(s) may be applied. As the user changes the viewing selection to bring the display field of view closer to the event extent, the effect(s) may be decreased/changed to a different type to indicate that the user is getting closer to viewing the event of interest. As the user changes the viewing selection to move the display field of view away from the event extent, the effect(s) may be increased/changed to a different type to indicate that the user is getting further away from viewing the event of interest.

For example, based on a user's viewing selection moving the display field of view away from the event extent, the colors of the video content may be removed (desaturated). Based on a user's viewing selection moving the display field of view towards the event extent, the colors of the video content may be added (saturated). As another example, based on a user's viewing selection moving the display field of view away from the event extent, a visual artifact (e.g., simulated sun glare) may be added to the presentation of the video content. Based on a user's viewing selection moving the display field of view towards the event extent, the visual artifact may be removed/reduced from the presentation of the video content.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although the processor 11 and the electronic storage 12 are shown to be connected to the interface 13 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
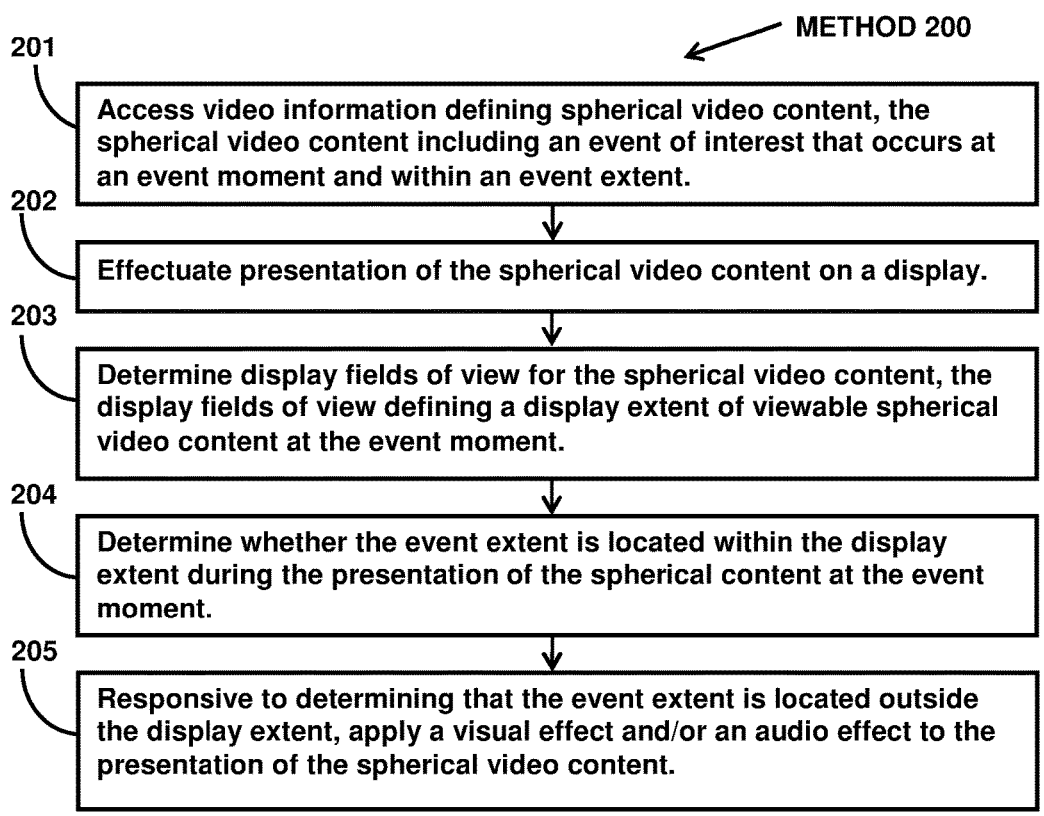
FIG. 2 illustrates a method for facilitating consumption of video content.

FIG. 2 illustrates method 200 for facilitating consumption of video content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining spherical video content may be accessed. The spherical video content may include an event of interest that occurs at an event moment and within an event extent. In some implementation, operation 201 may be performed by a processor component the same as or similar to the access component 102 (Shown in FIG. 1 and described herein).

At operation 202, presentation of the spherical video content on a display may be effectuated. In some implementations, operation 202 may be performed by a processor component the same as or similar to the presentation component 104 (Shown in FIG. 1 and described herein).

At operation 203, display fields of view for the spherical video content may be determined. The display fields of view may define a display extent of viewable spherical video content at the event moment. In some implementations, operation 203 may be performed by a processor component the same as or similar to the display field of view component 106 (Shown in FIG. 1 and described herein).

At operation 204, it may be determined whether the event extent is located within the display extent during the presentation of the spherical video content at the event moment. In some implementations, operation 204 may be performed by a processor component the same as or similar to the event extent component 108 (Shown in FIG. 1 and described herein).

At operation 205, responsive to determining that the event extent is located outside the display extent, a visual effect and/or an audio effect may be applied to the presentation of the spherical video content. In some implementations, operation 205 may be performed by a processor component the same as or similar to the effects component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that facilitates consumption of video content, the system comprising:
    one or more physical processors configured by machine-readable instructions to:
    access video information defining spherical video content, the spherical video content defining visual content viewable from a point of view as a function of progress through the spherical video content, the spherical video content having a progress length, wherein the spherical video content includes an event of interest, the event of interest occurring within an event moment in the progress length and within an event extent of the visual content viewable from the point of view at the event moment;
    effectuate presentation of the spherical video content on a display, wherein at least a portion of the presentation of the spherical video content is accompanied by playback of musical tracks;
    determine display fields of view for the spherical video content, the display fields of view defining extents of the visual content viewable from the point of view as the function of progress through the spherical video content, the display fields of view defining a display extent of the visual content at the event moment;
    determine whether the event extent is located within the display extent during the presentation of the spherical video content at the event moment to determine whether the event of interest is located within the display extent, wherein the event extent being located within the display event results in the event of interest being within the display extent and the event extent being located outside the display extent results in the event of interest not being within the display extent; and
    responsive to a determination that the event extent is located outside the display extent, apply a visual anomaly and/or an audio anomaly to the presentation of the spherical video content to degrade consumption quality of the visual content and/or the musical tracks and drive a user to change the display fields of view to include the event extent within the display extent, wherein:
    a type of the visual anomaly and/or the audio anomaly is determined based on the event of interest; and
    an amount of the visual anomaly and/or the audio anomaly is determined based on a distance between the event extent and the display extent such that a greater amount of the visual anomaly and the audio anomaly is applied to more greatly degrade the consumption quality of the visual content and/or the musical tracks based on a greater distance between the event extent and the display extent.

2. The system of claim 1, wherein application of the audio anomaly includes application of one or more of delay, echo, reverb, phasing, flanging, and/or volume change being applied to the musical tracks to degrade the consumption quality of the musical tracks.

3. The system of claim 1, wherein application of the audio anomaly includes one or more of the musical tracks being removed from playback.

4. The system of claim 1, wherein the portion of the presentation of the spherical video content is accompanied by the playback of musical tracks based on the event of interest.

5. The system of claim 1, wherein the musical tracks include one or more directional musical tracks.

6. The system of claim 1, wherein application of the visual anomaly includes application of one or more of snow, static, and/or glare to the visual content to degrade the consumption quality of the visual content.

7. The system of claim 1, wherein application of the visual anomaly includes a change in one or more of color, contrast, and/or luminance of the visual content to degrade the consumption quality of the visual content.

8. A method for facilitating consumption of video content, the method performed by a computing system including one or more physical processors, the method comprising:
    accessing, by the computing system, video information defining spherical video content, the spherical video content defining visual content viewable from a point of view as a function of progress through the spherical video content, the spherical video content having a progress length, wherein the spherical video content includes an event of interest, the event of interest occurring within an event moment in the progress length and within an event extent of the visual content viewable from the point of view at the event moment;
    effectuating, by the computing system, presentation of the spherical video content on a display, wherein at least a portion of the presentation of the spherical video content is accompanied by playback of musical tracks;
    determining, by the computing system, display fields of view for the spherical video content, the display fields of view defining extents of the visual content viewable from the point of view as the function of progress through the spherical video content, the display fields of view defining a display extent of the visual content at the event moment;
    determining, by the computing system, whether the event extent is located within the display extent during the presentation of the spherical video content at the event moment to determine whether the event of interest is located within the display extent, wherein the event extent being located within the display event results in the event of interest being within the display extent and the event extent being located outside the display extent results in the event of interest not being within the display extent;

responsive to determining that the event extent is located outside the display extent, applying, by the computing system, a visual anomaly and/or an audio anomaly to the presentation of the spherical video content to degrade consumption quality of the visual content and/or the musical tracks and drive a user to change the display fields of view to include the event extent within the display extent, wherein:

a type of the visual anomaly and/or the audio anomaly is determined based on the event of interest; and an amount of the visual anomaly and/or the audio anomaly is determined based on a distance between the event extent and the display extent such that a greater amount of the visual anomaly and the audio anomaly is applied to more greatly degrade the consumption quality of the visual content and/or the musical tracks based on a greater distance between the event extent and the display extent.

9. The method of claim 8, wherein application of the audio anomaly includes application of one or more of delay, echo, reverb, phasing, flanging, and/or volume change being applied to the musical tracks to degrade the consumption quality of the musical tracks.

10. The method of claim 8, wherein application of the audio anomaly includes one or more of the musical tracks being removed from playback.

11. The method of claim 8, wherein the portion of the presentation of the spherical video content is accompanied by the playback of musical tracks based on the event of interest.

12. The method of claim 8, wherein the musical tracks include one or more directional musical tracks.

13. The method of claim 8, wherein application of the visual anomaly includes application of one or more of snow, static, and/or glare to the visual content to degrade the consumption quality of the visual content.

14. The method of claim 8, wherein application of the visual anomaly includes a change in one or more of color, contrast, and/or luminance of the visual content to degrade the consumption quality of the visual content.

15. A system that facilitates consumption of video content, the system comprising:

one or more physical processors configured by machine-readable instructions to:

access video information defining spherical video content, the spherical video content defining visual content viewable from a point of view as a function of progress through the spherical video content, the spherical video content having a progress length, wherein the spherical video content includes an event of interest, the event of interest occurring within an event moment in the progress length and within an event extent of the visual content viewable from the point of view at the event moment;

effectuate presentation of the spherical video content of a display, wherein at least a portion of the presentation of the spherical video content is accompanied by playback of musical tracks based on the event of interest;

determine display fields of view for the spherical video content, the display fields of view defining extents of the visual content viewable from the point of view as the function of progress through the spherical video content, the display fields of view defining a display extent of the visual content at the event moment;

determine whether the event extent is located within the display extent during the presentation of the spherical video content at the event moment to determine whether the event of interest is located within the display extent, wherein the event extent being located within the display event results in the event of interest being within the display extent and the event extent being located outside the display extent results in the event of interest not being within the display extent; and responsive to a determination that the event extent is located outside the display extent, apply a visual anomaly and/or an audio anomaly to the presentation of the spherical video content to degrade consumption quality of the visual content and/or the musical tracks and drive a user to change the display fields of view to include the event extent within the display extent, wherein:

a type of the visual anomaly and/or the audio anomaly is determined based on the event of interest; and an amount of the visual anomaly and/or the audio anomaly is determined based on a distance between the event extent and the display extent such that a greater amount of the visual anomaly and the audio anomaly is applied to more greatly degrade the consumption quality of the visual content and/or the musical tracks based on a greater distance between the event extent and the display extent.

16. The system of claim 15, wherein application of the audio anomaly includes application of one or more of delay, echo, reverb, phasing, flanging, and/or volume change being applied to the musical tracks to degrade the consumption quality of the musical tracks and application of the visual anomaly includes a change in one or more of color, contrast, and/or luminance of the visual content to degrade the consumption quality of the visual content or application of one or more of snow, static, and/or glare to the visual content to degrade the consumption quality of the visual content.

* * * * *